United States Patent [19]

Suzuki

[11] Patent Number: 4,729,830

[45] Date of Patent: Mar. 8, 1988

[54] THREE-PHASE SEPARATION DEVICE USING DOUBLY-CANTED DECANTER

[75] Inventor: Souroku Suzuki, Mobara, Japan

[73] Assignee: Kotobuki Iron Works, Ltd., Japan

[21] Appl. No.: 943,653

[22] Filed: Dec. 17, 1986

[30] Foreign Application Priority Data

Dec. 27, 1985 [JP] Japan .............................. 60-293191

[51] Int. Cl.[4] .............................................. B01D 17/038

[52] U.S. Cl. .................................. 210/380.3; 494/53; 494/54; 494/66

[58] Field of Search ............................ 494/53, 54, 66; 210/389, 360.1, 369, 377, 380.1, 380.3

[56] References Cited

FOREIGN PATENT DOCUMENTS 934998 8/1963 United Kingdom .................. 494/54

*Primary Examiner*—Frank Sever

*Attorney, Agent, or Firm*—McGlew and Tuttle

[57] ABSTRACT

A solid-and-liquid separation device revolving at high speed, comprising a bowl having a screw therein, said bowl being formed with cylindrical and canted sections, thereby permitting separation of a fluid containing solids into light and heavy liquids and solids.

1 Claim, 5 Drawing Figures

THREE-PHASE SEPARATION DEVICE USING DOUBLY-CANTED DECANTER

BACKGROUND OF INVENTION

1. Field of Invention

The present invention relates to a device which separates into heavy and light liquids and solids a fluid consisting of heavy and light liquids and solid objects.

2. Description of the Prior Art

Heretofore, means, such as a centrifugal separator, for separating a fluid consisting of a mixture of heavy and light liquids and solids having a larger specific gravity than the heavy liquid into three phases of heavy and light liquids and solids have been utilized. Conventionally utilized three-phase separation means include, for example, means for separating a liquid into heavy and light liquids with a disc-type decanter after separating solids from the liquid with a common centrifugal separator or filter.

Three-phase separation utilizing, for instance, the screw-type decanter shown in FIG. 3 has been tried. As shown in FIG. 3, a screw-type decanter 20 consists of a bowl 21 comprising a cylindrical section 21_a_ and a conical section 21_b_ connected thereto, and a screw which is mounted coaxially in the bowl 21 with a small clearance between its pheripheral portion and the inner wall of the bowl, wherein, when the bowl 21 is rotated at a high speed, a fluid of a mixture of solids and a liquid poured (arrow A') into the bowl 21 is separated into solids indicated by arrow B' and light and heavy liquids indicated by arows C' and D', respectively. The taper angle $\theta$ of the conical section needs to be made small in order to effectively expel the solids. Generally the overall length of the decanter 20 cannot be made unduly long considering, the installation space and other factors. The length $L_1$ of the conical section 21_b_ cannot be made long in order to keep the length $L_2$ of cylindrical section 21_a_ long because of the limitation of the overall length $L_0$. Therefore this short length $L_1$ of the conical section as well as its small taper angle $\theta$ inevitably render the depth D of the fluid in the bowl 21 shallow.

In the invention disclosed in Japanese Patent Laid-open No. 50-54161 by the inventor, a screw-type decanter, such as shown in FIG. 3, has two-staged tapering angles $\theta_1$ and $\theta_2$ of the conical section 21_b_ as shown in FIG. 4, wherein the tapering angle $\theta_1$ of the portion adjacent to the cylindrical section 21_a_ is made larger, and the tapering angle $\theta_2$ of the next portion is made smaller. This design permits the depth D of the fluid (FIG. 3) to be relatively large. This type of decnater only permits the separation of two phases of liquid and solids, but not the separation of light and heavy liquids.

The means described above, in which a liquid is separated into heavy and light liquids with a disc-type decanter after solids are separated from a fluid with a centrifuge or filter, requires two sets of centrifuges, requiring two treatments of high energy consumption, resulting in high costs for installation and operation.

A screw-type decanter, such as shown in FIG. 3, cannot fully separate two phases of liquids (heavy and light liquids) because of the shallow depth D of the liquid in the bowl, so that it is common practice to repeat the separation treatment with a disc-type decanter, for example, to separate the liquids.

An example of test result data utilizing the duplicated separation treatments described above with a two-phase separation decanter and disc-type decanter (separation plate-type centrifuge) is shown in the block diagram in FIG. 5. As shown in the data in FIG. 5, which are test results in a fish meal plant, oil in the light liquid was accompanied by water of 2.5% by volume and solids of 2.0% by volume, requiring polishing with a separation plate-type centrifuge (disc-type decanter) as an after-treatment. Thus, three-phase separation with a single treatment, in which a reduction in construction cost due to a reduced number of machines and a reduction in energy cost due to reduced operations can be attained, was not accomplished.

The reasons for this is as follows. In the screw-type decanter described above in reference to FIG. 3, the depth D of the fluid in the bowl 21 is inevitably shallow, so that the separation of solids from the liquid becomes insufficient when the specific gravities of the solids and liquid in a suspension fluid to be treated do not show much difference.

Furthermore, if the decanter of this type is used for three-phase separation, it is difficult to set an interface between the heavy and light liquids due to the insufficient, shallow depth D of the liquid and turbulence from the fluid flow, the turbulence also stirring up the solids, thereby rendering satisfactory separation impossible.

A screw-type decanter having two-staged tapering angles in the conical section as described in reference to FIG. 4 is conventionally used to separate two phases, i.e., solids and liquids, but is not constructed to properly separate three phases, i.e., heavy and light liquids and solids.

BRIEF SUMMARY OF INVENTION

The object of the present invention is to provide a screw-type decanter which makes it possible to perform as exactly as practicable three-phase separation of a fluid comprising heavy and light liquids and solids, the separation being heretofore impossile with a single centrifugal separator.

One means of the present invention for solving the above-described problems is a screw-type solid-and-liquid separation device which permits high speed revolution, said device comprising a bowl having a cylindrical section and a canted section connected thereto, and a screw coaxially mounted in the bowl with a small clearance between the peripheral portion thereof and the inner wall of the blow: characterized in that the tapering angle of the canted section in the region adjacent to the cylindrical section is formed larger than the tapering angle of the canted section in the leading end region; the end portion of the cylindrical seciton opposite the canted section is provided with a heavy liquid exit port and a light liquid exit port, said heavy liquid exit port being disposed near the inner surface of the bowl and said light liquid exit port being disposed near the surface of the fluid in the bowl.

If a fluid comprising a mixture of heavy and light liquids and solids is poured in the bowl revolving at a high speed, the solids are separated from the liquids by centrifugal force and expelled from the leading end of the canted section by means of the screw. The liquid phase is separated into heavy and light liquids which are extracted respectively from the heavy liquid and light liquid exit ports with almost perfect distinction since the depth of the fluid in the bowl is made large enough to maintain a stable interface between the heavy and light liquids in the device of the present invention.

DETAILED DESCRIPTION OF THE INVENTION

The present invention will be described hereunder by way of an example with reference to the drawings.

Figure 1:
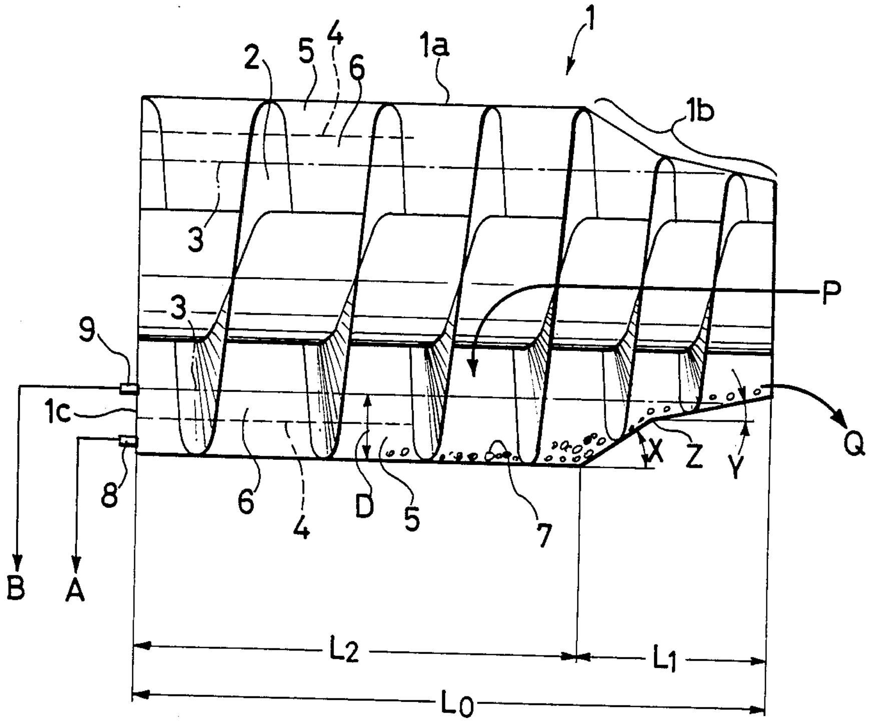
FIG. 1 is a longitudinal section of an embodiment of the present invention.

FIG. 1 is a sectional view taken longitudinally through an embodiment of the present invention. As shown in FIG. 1, a bowl 1 consists of a cylindrical section 1*a* and a canted section 1*b* connected thereto, a screw 2 being mounted coaxially in the bowl 1 with a slight clearance between the peripheral portion of the screw 2 and the inner wall of the bowl 1. The canted section 1*b* is divided at Z into two parts having different tapering angles, the part adjacent to the cylindrical section 1*a* having a larger tapering angle X than the tapering angle Y of the leading end part next thereto. Preferably the angle X is 10°-80° and the angle Y is 2°-15°. 3 designates the fluid surface. The canted section may have more than two parts having different tapering angles or may have a curved surface. The portion of the canted section immediately below the fluid surface 3 may be provided with a sump in order to prevent sunken solids which are to be conveyed beyond the fluid surface from reversely flowing into the liquid. A heavy liquid exit port 8 and a light liquid exit prot 9 are provided in the end portion 1*c* of the cylindrical section 1a opposite the canted section 1*b* of the bowl 1. The heavy liquid exit port 8 is disposed near the inner surface of the bowl 1, i.e., the lower level of the liquid, and the light liquid exit port 9 is disposed near the liquid surface, i.e., the upper level of the liquid. The invention can provide a large length $L_2$ of the cylindrical section 1*a* without making the overall length $L_0$ unduly large, as well as a large depth D of liquid from the liquid surface 3 even through the length $L_1$ of the canted section 1*b* is short, because of the formation of the two different tapering angles.

The operation using this device for three-phase separation which separates heavy and light liquids and solids from a flúid of a mixture of heavy and light liquids and solids heavier than the heavy liquid will be described hereunder.

First, the mixture fluid is fed into the bowl 1 as shown by the arrow P, when the bowl 1 is revolving at a high speed together with the screw 2. Solids 7 separated from the mixture fluid by centrifugal force are transported from the portion immediately below the fluid surface 3, along the gently canted surface of the tapered part 1*b* to the portion above the fluid surface 3. When solids are to be separated from liquids using this device, sunken solid particles 7 are subject to the action of centrifugal force induced by the difference in specific gravity between the liquid and the solid particles 7 below the fluid surface, and are subject to centrifugal force in proportion to the specific gravity of the solid particles 7 above the fluid surface. Therefore it is possible to transport the solid particles 7 even though the tapering angle of the canted section is made large under the fluid surface 3 in order to expel the solid particles 7. However, since the effect of centrifugal force applied to the solid particles above the fluid level is relatively large, the tapering angle of the portion above the fluid surface is made smaller in order to facilitate transportation of the solid particles. The device makes it possible to construct a small-size unit while keeping high performance for expelling the sunken solid particles 7, and yields satisfactory results in separating solids from liquid in a suspension fluid of materials, such as active mud, which have specific gravities of 1.02-1.04, i.e., close to that of water, which consist of small particles, and which show a pudding- or paste-like condition after water is extracted to form cakes which are very susceptible to plastic deformation.

The device, since it is based on the principle described above, can have a greater depth of fluid and a larger effective length of straight barrel than devices of the prior art of similar size, with the result that it can secure effectively hold fluids almost twice as long as devices of the prior art.

Further, the liquid, from which the solids have been expelled, is separated by centrifugal force into heavy liquid 5 and light liquid 6. Heavy liquid 5 situated at the deeper level is taken out from the heavy liquid exit port 8 near the inner wall of the bowl 1, and light liquid 6 is taken out from the light liquid exit prot 6 near the liquid surface, both flowing out as shown by arrows A and B or being extracted by skimming pipes. Thus, by taking out heavey liquid 5 from a deep spot remote from the liquid surface 3 and light liquid 6 from a spot near the liquid surface 3 separately, the interface 4 between heavey and light liquid 5, 6 can be stably maintained so that separation between heavy liquid 5 and light liquid 6 can be conducted effectively with good results over an extended period of time, and at the same time, the separation of solids 7 can be done with excellent performance through long holding time and reduced turbulence because of the larger liquid depth, thereby outstanding result in three-phase separation being possibly accomplished.

Next, results of a practical test of the device of the invention in a fish meal plant are shown by data as a block diagram in FIG. 2, and will be described in comparison with the test data of the device of the prior art in FIG. 5.

Figure 2:
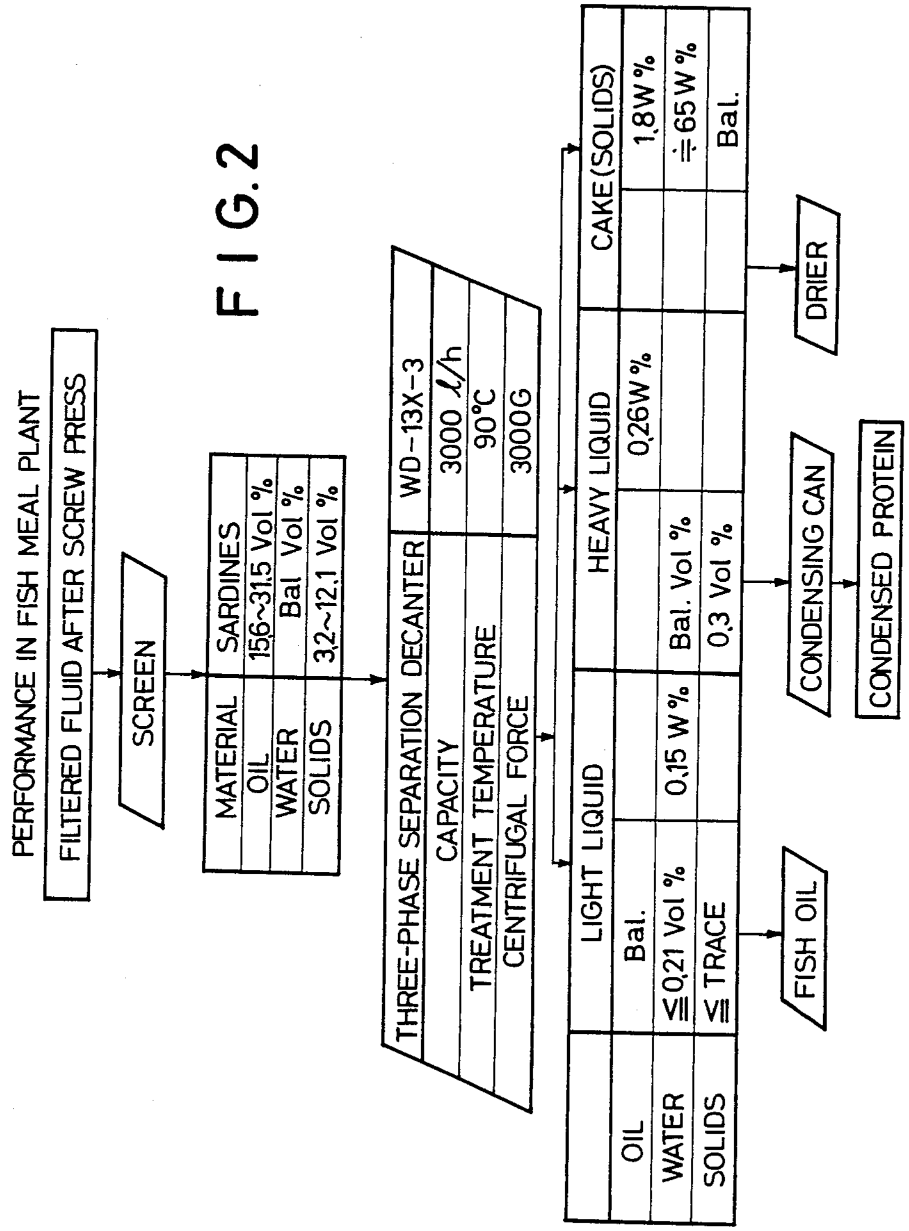
FIG. 2 is a block diagram of data of three-phase separation with a device of the present invention.
Figure 3:
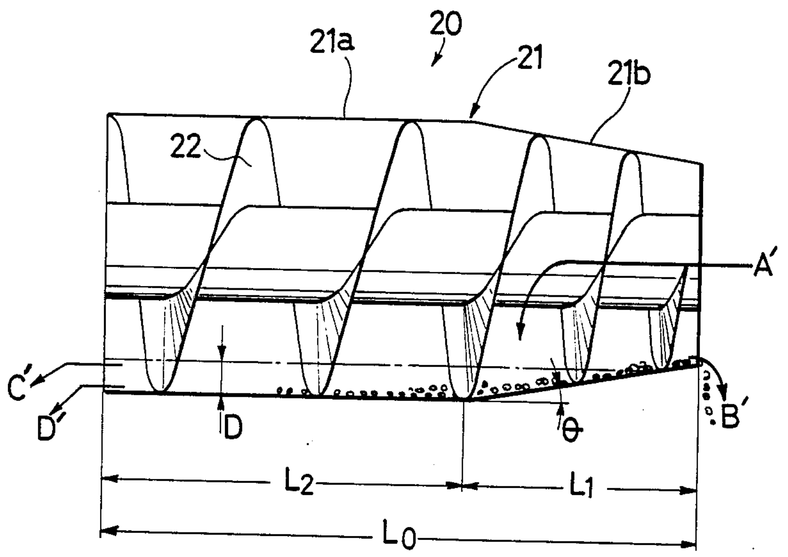
FIG. 3 is a longitudinal section of a screw-type decanter of the prior art.
Figure 4:
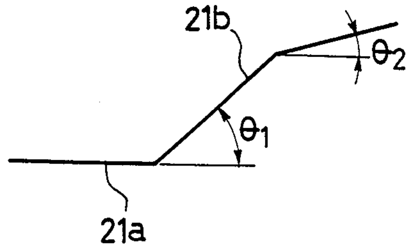
FIG. 4 is a partial section of a screw-type decanter according to the present invention.
Figure 5:
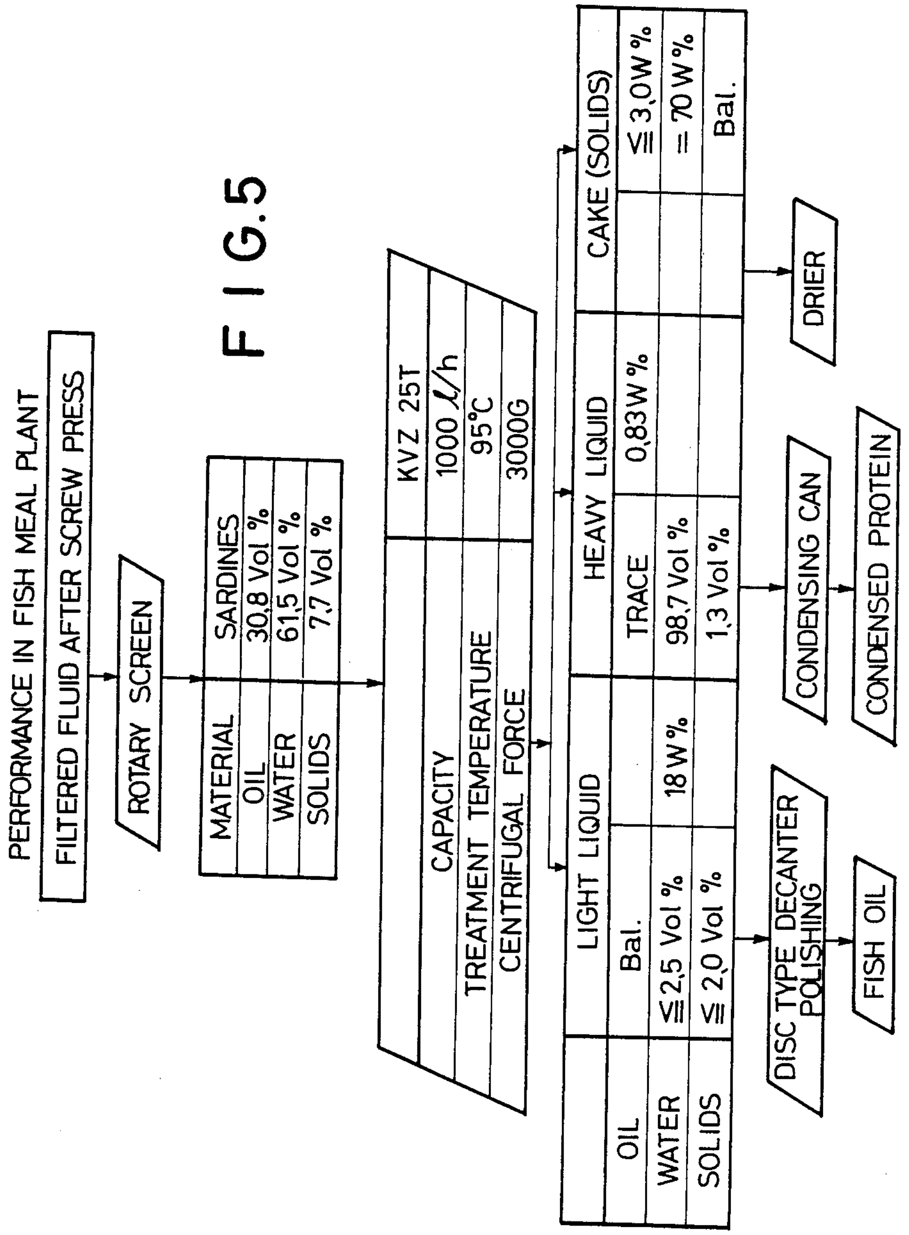
FIG. 5 is a block diagram of data of three-phase separation with a device of the prior art.

FIG. 2 is data from a single separation operation with a screw-type decanter of the invention, while FIG. 5 is data from separation operations with a three-phase separation decanter of the prior art.

In comparing the data, the characteristics of the separation of light and heavy liquids and solids shown in the data in FIG. 2 are much better in all respects than those in the data in FIG. 5, which were obtained from the device of the prior art. While the light liquid is again subject to sepration through a separation plate-type centrifuge in the prior art, the device of the present invention does not necessitate polishing with a separation plate-type decanter. Further, the heavy liquid obtained through tghe decanter of the prior art is accompanied by a rich oil residue which reduces the amount of acquired fish oil having a high commercial value, and is also accompanied by many solids to cause clogging in a condensing can, thereby preventing the device of the prior art from practical use. On the contrary, the device of the present invention permits a single unit to perform separation equal to or better than the means of the prior art in which the liquid, after the solids are removed through a conventional screw-type decanter (or filter), is further seprated into heavy and light liquids through a separation plate-type decanter.

As described above, in the screw-type decanter of the present invention, multiple regions of different tapering angles are formed in the canted section of the bowl to obtain a large fluid depth in the bowl, and heavy liquid and light liquid exit ports are disposed remote from and near the liquid surface, respectively, so that three-phase separation of heavy and light liquids and solids from a fluid containing heavy and light liquids and solids which have a larger specific gravity than the heavy liquid can be performed almost perfectly.

Therefore, the following advantages are exhibited by the present invention:

1. While two units are required to separate the solids and to separate the heavy and light liquids in the prior art, only one unit of a centrifugal separator can perform the entire operation in the present invention, thereby drastically reducing machine costs and expenditures for power facilities, buildings and maintenance.

2. The energy requirement is reduced due to single operation, compared to separate operations for solid-liquid separation and for liquid-liquid separation in the prior art.

What is claimed is:

1. A three phase separation device for fluids, comprising means for enabling practicable three-phase separation of a fluid comprising heavy and light liquids and solids, including, a bowl for the fluid including a hollow cylindrical section having first and second ends, a canted section connected to said first end of said cylindrical section and having first and second portions of different tapering angles including a first portion adjacent said cylindrical section which is of a larger tapering angle than said second portion which is remote from said cylindrical section, a screw rotatably mounted in said bowl and extending through said cylindrical section and said canted section and having a screw thread conforming to the configuration of each section, a heavy liquid exit port on said second portion of said cylindrical section adjacent its exterior side, and a light exit port on said cylindrical section spaced radially inwardly of said heavy liquid exit port and near the surface of the fluid.

* * * * *